United States Patent [19]

Naruse et al.

[11] 4,110,477
[45] Aug. 29, 1978

[54] METHOD FOR PRODUCING NATTO CONTAINING LACTIC ACID BACTERIA

[75] Inventors: Kintaro Naruse; Wataru Naruse, both of Tokyo, Japan

[73] Assignee: Kabushiki Kaisha Naruse Fermentation Laboratory, Tokyo, Japan

[21] Appl. No.: 796,706

[22] Filed: May 13, 1977

[51] Int. Cl.$^2$ .............................................. A23L 1/20
[52] U.S. Cl. ...................................... 426/46; 426/44; 426/52
[58] Field of Search ................ 426/46, 44, 52, 60; 195/28 N, 96, 100, 111, 102, 29

[56] References Cited

U.S. PATENT DOCUMENTS 2,890,988  6/1959  Burger et al. ...................... 195/111

FOREIGN PATENT DOCUMENTS 221,716  1/1956  Japan ................................. 426/46

OTHER PUBLICATIONS

Smith et al., "Soybeans: Chemistry & Technology" vol. 1, 1972 pp. 14, 246–247, 402–403 & 445 Avi Publishing Co.

*Primary Examiner*—R. B. Penland
*Attorney, Agent, or Firm*—Cushman, Darby & Cushman

[57] ABSTRACT

By growing *Bacillus natto* and lactic acid bateria on steamed soybeans in the presence of triturated mushroom and carbon sources for the cultivation of lactic acid bacteria, there is obtained a fermentation food of soybeans grown with both live bacteria. As compared with soybeans grown with *Bacillus natto* alone ("Natto"), the present fermentation food lacks objectionable off-flavor or an ammonia odor and keeps its quality unchanged for a longer period.

14 Claims, No Drawings

METHOD FOR PRODUCING NATTO CONTAINING LACTIC ACID BACTERIA

This invention relates to a method for preparing "*natto*" and, more particularly, to a method for preparing *natto* grown with not only *Bacillus natto*, but also lactic acid bacteria.

*Natto* is a fermentation food product prepared by growing *Bacillus natto* on steamed soybeans and has been consumed by the Japanese since ancient times as one of the important protein sources. In spite of its rich nutritive value, however, *natto* has a characteristic off-flavor involving an ammoniacal odor, which is liable to be objectionable to the taste of most of the foreigners and even some of the Japanese. The ammoniacal odor increases with the storage time of *natto*.

The present inventors had been engaged in extensive studies in order to eliminate the above disadvantage of *natto* as well as from the standpoint that it would be beneficial to the maintainance and promotion of health to ensure a well-balanced state in the useful human intestinal bacterial flora by adjusting and improving the type and property of each bacterium. As a result, the present inventors formerly worked out a method, on which Japanese Pat. No. 221,716 has been issued, for preparing a novel *natto* containing lactic acid bacteria (this *natto* is hereinafter referred to as "Yogurunatto") by the joint use of *Bacillus natto* and lactic acid bacteria having entirely different property from that of the former, such a combination having never been considered in prior art. Although the said patented method succeeded in producing a product having considerably improved flavor as compared with conventional *natto*, the improvement is hardly stated as sufficient.

The present inventors further continued the studies to improve the quality of the product and have now accomplished the present invention.

According to this invention, there is provided a method for producing Yogurunatto, which comprises growing *Bacillus natto* and lactic acid bacteria on steamed soybeans in the presence of a nutritive medium containing homogenized mushroom (*Lentinus edodes* (Berk) Sing).

The results of studies of the present inventors showed that the insufficient improvement in flavor of the product obtained by the above-said patented method is due to a relatively small lactic acid bacteria content. In the present method, addition of the homogenized mushroom as a new nutrition source markedly enhances growth of the lactic acid bacteria, without appreciably restraining the fermentation activity of the *Bacillus natto*, and allows it possible to product Yogurunatto having none of the objectionable odors including an ammoniacal odor characteristic of the conventional *natto*, even after a reasonable storage time.

Since the product prepared by the method of this invention contains usually more than twice as much active lactic acid bacteria, as compared with a product prepared by the former patented method, it is a health food useful for the improvement of balance among the intestinal bacteria and having, at the same time, far improved flavor by eliminating undesirable odor characteristic of *natto*.

The steamed soybeans used as starting material include not only of soybeans themselves but also modified protein therefrom such as steamed defatted soybeans and soybean protein curd. The starting material can be prepared according to the customary procedure for producing conventional *natto* by subjecting sorted soybeans or others to washing, then soaking in water, draining, and steaming. The soaking in water is carried out at room temperature for about 10 to 15 hours until the weight of soaked soybeans becomes about twice the initial weight. The steaming is conducted under a pressure of about 1 atm. (gage) for 30 to 50 minutes so that the steamed soybeans may preferably become pale yellowish brown in color, agreeable in smell, and slightly sweet and palatable in taste. The steamed soybeans are then cooled to 40° to 50° C by use of a jet condenser or by other means and subjected to growing and fermentation of *Bacillus natto* and lactic acid bacteria.

The *Bacillus natto* to be used can be any species conventionally employed in *natto* production. Examples are *Bacillus natto* Sawamura No. 1 and *Bacillus natto* Muramatu & Naruse No. 5, a mixture of these being particularly recommendable. These bacilli are commercially available in the form of suspension or powder, the latter being more suitable.

The lactic acid bacteria to be used are those species which are usually employed in the production of fermented foods, such as, for example, sporeforming lactic acid bacteria which are highly stable, yogurt lactic acid bacteria which are excellent in flavor, or brewery lactic acid bacteria which are relatively stable. Recommendable species are *Lactobacillus sporogenes* Sakaguti & Nakayama (ATCC 31284), *Lactobacillus acidophilus* (I.F.O. 3831) Kitahara (ATCC 31283), and *Pediococcus acidilactici* Matumoto (ATCC 31282), the first named species being thermostable. The most recommendable practice is to use jointly all three of above-noted species. These species are commercially available in Japan and when used in the present method, their growth is very remarkable.

In carrying out the present method, a suspension of a seed culture mixture is prepared starting from each of the seed cultures of *Bacillus natto* and lactic acid bacteria or from a mixture of both seed cultures. In making the suspension, both seed cultures are dispersed by means of a homogenizer sufficiently uniformly in a sterile water medium or preferably a sodium chloride injection medium. When a thermostable lactic acid bacterium is used, it is desirable that the suspension containing said bacterium be subjected to preliminary heat shock treatment at 75° C for 30 minutes in order to stimulate the bacterium and promote the germination. The suspension of seed culture mixture obtained can be stored for a short period at low temperatures, e.g., 2° to 5° C, until it is used. It is desirable to use the seed suspension within 1 or 2 days.

The nutritive medium for use in the present method contains common carbon sources for lactic acid bacteria, such as glucose, lactose, powdered milk whey, skimmed milk powder, or a mixture thereof, and nitrogen sources such as peptone and yeast extract. The nitrogen source can be omitted, because proteins of the soybeans are utilized instead. If necessary, inorganic salts and other nutrients such as amino acids, vitamins, and nucleic acid may be added.

In order to achieve the object of this invention, it is further necessary to add to the medium an aqueous suspension of mushroom prepared by homogenizing the latter in water. Mushroom is soaked in water and homogenized by means of a homogenizer to obtain the suspension of mushroom. This suspension is sterilized at 75° to 80° C for 30 minutes and then cooled to 40° to 45°

C. The suspension thus treated is ready for use or can be used after having been refrigerated at 2° to 5° C. Although a fresh raw mushroom is most suitable as the starting material, it is not objectionable to use it after having been freeze-dried in vacuum.

The nutritive medium contains in 1 liter each 25 to 75 g of glucose and lactose as carbon source, 50 to 150 g of raw mushroom, and, if necessary, 5 to 15 g of peptone, 2.5 to 7.5 g of yeast extract, and 5 to 15 g of amino acids as nitrogen source, and inorganic salts (4 to 12 g of sodium chloride); pH is adjusted to 6.5.

Growth of the bacteria on steamed soybeans is effected by spraying or steamed soybeans the nutritive medium uniformly admixed with the bacteria suspension spraying on and incubating, in a customary way, at 40° to 42° C for 18 to 20 hours.

Owing to the presence of constituents of mushroom, the sprayed liquor becomes properly viscous and sticks uniformly to the soybeans around the surface to allow the bacteria to distribute uniformly. Presumably because of effective utilization of unknown constituents of mushroom, growth of both *Bacillus natto* and lactic acid bacteria is very lively and particularly lactic acid bacteria grow very rapidly, reaching in number even more than $10^9$ per g of the product. The Yogurunatto thus obtained has the same appearance and threading property characteristic of the conventional *natto*, yet lacking the characteristic *natto* odor or an ammoniacal odor, and, moreover, contains abundant lactic acid bacteria which are very valuable for the human body and not found in conventional natto.

After cooling, the product can be served immediately on the table but usually is sold and consumed after having been refrigerated. After storage in a refrigerator at 5° to 10° C for several days, Yogurunatto becomes ideal for eating. At 30° C, conventional *natto* can be preserved only for about 2 days, whereas the Yogurunatto according to this invention retains its quality unchanged for a far longer period.

In order to further stabilize the excellent properties of Yogurunatto and to render the latter more popular, the product can be freezed and vacuum-dried into dried Yogurunato or powdered Yogurunato which has longer storage life and universality in transportation, handling, locality of consumption and palatable period.

The invention is illustrated below in detail with reference to Example, but the invention is not limited thereto.

EXAMPLE

Washed soybeans were soaked in cold water for 12 hours. After draining, the soaked soybeans were charged into a pressure kettle and heated in a steam under a pressure of 1 kg/cm² (gage) for 45 minutes. After having been cooled to about 40° C, the weight of steamed soybeans became about twice the initial weight. *Bacillus natto* and lactic acid bacteria (the thermostable species had been subjected to heat-shock treatment), shown in the following Tables, were suspended in a nutritive liquor containing in 1 liter each 50 g of glucose and lactose, 10 g of peptone, 5 g of yeast extract, 10 g of an amino acid, 8 g of common salt, and 100 g of homogenized raw mushroom. The resulting suspension was sprayed onto the steamed soybeans at an application rate of 40 ml per 400 g of steamed soybeans to inoculate bacteria (plural number of species) in numbers as shown in Tables. The inoculated soybeans were uniformly mixed. Each 100 of the mixture was packed in a suitable vessel and incubated in a fermentation room at 40° to 42° C for 18 to 20 hours. The natto produced was taken out of the fermentation room and refrigerated.

Four days and 14 days after production, the numbers of *Bacillus natto* and lactic acid bacteria in 1 g of *natto* were measured and, at the same time, sensory tests were performed for the qualities of *natto* such as color, odor, threading, and taste. The ammonia nitrogen and pH were measured after 14 days from production. Some of the products were freeze-dried after production and measured for the number of lactic acid bacteria.

For comparison, fermentation tests were carried out using the same nutritive liquor as above, except that raw mushroom was not added. Fermentation tests for *Bacillus natto* alone were also preformed.

The results obtained were as shown in Tables 1 to 3.

From Table 1 which shows results of fermentation according to this invention, when *Bacillus natto* and one species of lactic acid bacteria were used, it is seen that growth of lactic acid bacteria in the presence of raw mushroom is twice as lively as that in comparative examples wherein raw mushroom was absent in the medium. From Table 2 which shows the results when two or more species of lactic acid bacteria were used, it is seen that growth of *Bacillus natto* tends to be repressed, whereas growth of lactic acid bacteria is more lively. The results were particularly striking when three species were jointly used. The products obtained showed desirable results of sensory tests and had favorable appearance. Even after 14 days from the production date, the product showed neither characteristic natto odor nor ammonia odor, as confirmed by the results of tests for ammonia nitrogen and pH.

From Table 3, it is seen that even freeze-dried product contained more than about $2 \times 10^8$ of lactic acid bacteria per gram.

Table 1

| Item Section No. | Weight of raw soybeans used (g) | Amount of natto produced | Bacillus natto*¹ (number of bacteria per 100 g of steamed soybeans) | Lactic acid bacteria A² (number of bacteria per 100 g of steamed soybeans) | Lactic acid bacteria B³ (number of bacteria per 100 g of steamed soybeans) | Lactic acid bacteria C⁴ (number of bacteria per 100 g of steamed soybeans) | Nutritive liquor (ml per 400 g of steamed soybeans) | Homogenized mushroom liquor (in terms of raw mushroom) (g) |
|---|---|---|---|---|---|---|---|---|
| I | 200 | 100 g × 4 | 4,000 | — | — | — | 40 | — |
|   |     |           | 4,200 | — | — | — | " | 4 |
| II | 200 | 100 g × 4 | 3,500 | 250,000 | — | — | " | — |
|    |     |           | 4,800 | 270,000 | — | — | " | 4 |
| III | 200 | 100 g × 4 | 3,600 | — | 7,000 | — | " | — |
|     |     |           | 4,500 | — | 8,000 | — | " | 4 |
| IV | 200 | 100 g × 4 | 4,200 | — | — | 130,000 | " | — |
|    |     |           | 4,000 | — | — | 140,000 | " | 4 |

Number of bacteria

Table 1-continued

| Item Section No. | Days after production (day) | per g of product natto Bacillus natto | Lactic acid bacteria | Appearance-color | Odor | Threading | Flavor | Overall rating |
|---|---|---|---|---|---|---|---|---|
| I | 4 | 33 × 10⁸ | — | Pale brown | Natto odor | Strong | Good | Good |
|  | " | 43 × 10⁸ | — | " | " | " | " | " |
| II | " | 29 × 10⁸ | 2.1 × 10⁸ | " | No natto odor | " | Fair to good; mellow | Fine |
|  | " | 46 × 10⁸ | 4.6 × 10⁸ | " | " | " | " | " |
| III | " | 29 × 10⁸ | 0.7 × 10⁸ | " | Scarcely natto odor | " | Fair to good | " |
|  | " | 44 × 10⁸ | 1.5 × 10⁸ | " | " | " | Fair to good; mellow | " |
| IV | " | 41 × 10⁸ | 1.4 × 10⁸ | " | No natto odor | " | " | " |
|  | " | 31 × 10⁸ | 3 × 10⁸ | " | " | " | " | " |

Note:
¹*Bacillus natto*: A 1 :1 mixture of *Bacillus Natto* Sawamura No. 1 and *Bacillus Natto* Muramatu & Naruse No. 5
²Lactic acid bacteria A: *Lactobacillus Sporogenus* Sakaguti & Nakayama (ATCC 31284)
³Lactic acid bacteria B: *Lactobacillus acidophilus* (I.F.O. 3831) Kitahara (ATCC 31283)
⁴Lactic acid bacteria C: *Pedicoccus acidilactici* Matumoto (ATCC 31282)

Table 2

| Item Section No. | Weight of raw soybeans used (g) | Amount of natto produced | Bacillus natto (number of bacteria per 100 g of steamed soybeans) | Lactic acid bacteria A (number of bacteria per 100 g of steamed soybeans) | Lactic acid bacteria B (number of bacteria per 100 g of steamed soybeans) | Lactic acid bacteria C (number of bacteria per 100 g of steamed soybeans) | Nutritive liquor (ml per 400 g of steamed soybeans) | Homogenized mushroom liquor (in terms of raw mushroom) (g) |
|---|---|---|---|---|---|---|---|---|
| I' | 200 | 100 g × 4 | 1,000 | — | — | — | 40 | — |
|  |  |  | 600 |  |  |  | " | 4 |
| II' | 200 | 100 g × 4 | 1,150 | 400,000 | 12,000 | — | " | — |
|  |  |  | 650 | 420,000 | 30,000 | — | " | 4 |

| Item Section No. | Days after production (day) | Number of bacteria per g of product natto Bacillus natto | Lactic acid bacteria | Ammonia nitrogen (mg/100 g of natto) | pH | Appearance-color | Odor | Threading | Flavor | Overall rating |
|---|---|---|---|---|---|---|---|---|---|---|
| I' | 4 | 12 × 10⁸ | — | — | — | Pale brown | Natto odor | Strong | Good (= conventional natto) | Good |
|  | 4 | 7.5 × 10⁸ | — | — | — | " | Strong natto odor | " | " | Good natto |
|  | 14 | 0.19 × 10⁸ | — | 101.1 | 6.9 | " | Natto odor | " | Good | Good |
| II' | 4 | 16 × 10⁸ | 6 × 10⁸ | — | — | " | No natto odor | " | Fair to good; mellow | Fine |
|  | 4 | 11 × 10⁸ | 16.3 × 10⁸ | — | — | " | Scarcely natto odor | " | Refreshing | " |
|  | 14 | 0.54 × 10⁸ | 2.3 × 10⁸ | 68.4 | 6.9 | " | No natto odor | " | Fair | " |

| Item Section No. | Weight of raw soybeans used (g) | Amount of natto produced | Bacillus natto | Lactic acid bacteria A | Lactic acid bacteria B | Lactic acid bacteria C | Nutritive liquor | Homogenized mushroom liquor |
|---|---|---|---|---|---|---|---|---|
| III' | 200 | 100 g × 4 | 1,300 | 450,000 | — | 200,000 | 40 | — |
|  |  |  | 630 | 500,000 | — | 300,000 | " | 4 |
| IV' | 200 | 100 g × 4 | 1,300 | — | 15,000 | 280,000 | " | — |
|  |  |  | 800 | — | 20,000 | 280,000 | " | 4 |
| V' | 200 | 100 g × 4 | 1,050 | 380,000 | 13,000 | 180,000 | " | — |
|  |  |  | 650 | 450,000 | 18,000 | 250,000 | " | 4 |

| Item Section No. | Days after production (day) | Number of bacteria per g of product natto Bacillus natto | Lactic acid bacteria | Ammonia nitrogen (mg/100 g of natto) | pH | Appearance-color | Odor | Threading | Flavor | Overall rating |
|---|---|---|---|---|---|---|---|---|---|---|
| III' | 4 | 20 × 10⁸ | 9 × 10⁸ | — | — | Pale brown | No natto odor | Strong | Fair to good; mellow | Fine |
|  | 4 | 15 × 10⁸ | 20 × 10⁸ | — | — | " | Scarcely natto odor | " | Refreshing | " |
|  | 14 | 1.6 × 10⁸ | 6.8 × 10⁸ | 48.4 | 6.5 | " | No natto odor | " | Fair | " |
| IV' | 4 | 20 × 10⁸ | 4.2 × 10⁸ | — | — | " | " | " | Fair to good; mellow | " |
|  | 4 | 23 × 10⁸ | 9 × 10⁸ | — | — | " | Scarcely natto odor | " | Refreshing | " |
|  | 14 | 1.9 × 10⁸ | 3.5 × 10⁸ | 54.4 | 6.6 | " | No natto odor | " | Fair | " |

Table 2-continued

| V' | 4 | $14 \times 10^8$ | $7.0 \times 10^8$ | — | — | " | odor " | " | Fair to good; mellow | " |
| --- | --- | --- | --- | --- | --- | --- | --- | --- | --- | --- |
| | 4 | $13 \times 10^8$ | $15 \times 10^8$ | — | — | " | Scarcely natto odor | " | Refreshing | " |
| | 14 | $0.37 \times 10^8$ | $5.5 \times 10^8$ | 48.4 | 6.4 | " | No natto odor | " | Fair | " |

Table 3

| Item Section No. | Weight of raw soybeans used (g) | Amount of nitto produced | Inoculated bacteria and their numbers | | | |
| --- | --- | --- | --- | --- | --- | --- |
| | | | *Bacillus natto* (number of bacteria per 100 g of steamed soybeans) | Lactic acid bacteria A (number of bacteria per 100 g of steamed soybeans) | Lactic acid bacteria B (number of bacteria per 100 g of steamed soybeans) | Lactic acid bacteria C (number of bacteria per 100 g of steamed soybeans) |
| II' | 200 | 100 g × 4 | 650 | 420,000 | 30,000 | — |
| III' | 200 | 100 g × 4 | 630 | 500,000 | — | 300,000 |
| V' | 200 | 100 g × 4 | 650 | 450,000 | 18,000 | 250,000 |
| | | Nutritive liquor (ml per 400 g of steamed soybeans) | Homogenized mushroom liquor (in terms of raw mushroom) (g) | Number of lactic acid bacteria per g of natto before vacuum freeze drying | Number of lactic acid bacteria per g of natto after vacuum freeze drying | |
| | | 40 | 4 | $8.6 \times 10^8$ | $2.9 \times 10^8$ | |
| | | " | " | $2.9 \times 10^8$ | $1.6 \times 10^8$ | |
| | | " | " | $18.0 \times 10^8$ | $8.2 \times 10^8$ | |

What is claimed is:

1. A method for producing *natto* containing lactic acid bacteria, which comprises growing *Bacillus natto* and lactic acid bacteria on steamed soybeans in the presence of a nutritive medium containing a homogenized aqueous mushroom suspension.

2. The method according to claim 1, wherein the steamed soybean is steamed defatted soybean or soybean protein curd.

3. The method according to claim 1, wherein the lactic acid bacterium is at least one member selected from the group consisting of *Lactobacillus sporogenes* Sakaguti & Nakayama (ATCC 31284), *Lactobacilius acidophilus* (I.F.O. 3831) Kitahara (ATCC 31283), and *Pediococcus acidilactici* Matumoto (ATCC 31282).

4. A method according to claim 1, wherein the lactic acid bacteria are a mixture of *Lactobacillus sporogenes* Sakaguti & Nakayama (ATCC 31284), *Lactobacillus acidophilus* (I.F.O. 3831) Kitahara (ATCC 31283), and *Pediococcus acidilactici* Matumoto (ATCC 31282).

5. A method according to claim 1, wherein the *Bacillus natto* is a mixture of *Bacillus natto* Sawamura No. 1 and *Bacillus natto* Muramatu & Naruse No. 5.

6. A method according to claim 1, wherein the nutritive medium for the cultivation of lactic acid bacteria contains a carbon source comprising at least one member selected from the group consisting of glucose, lactose, powdered milk whey, and skimmed milk powder.

7. A method according to claim 1, wherein the growth is effected at a temperature of 40° to 42° C for 18 to 20 hours.

8. A *natto* containing lactic acid bacteria, which is produced by the method according to claim 1.

9. A freeze-dried powdered *natto* from the *natto* according to claim 8.

10. *natto* method lactic to claim 1 wherein the mushroom is *Lentinus edodes*.

11. A method according to claim 3 wherein the mushroom is *Lentinus edodes*.

12. A method according to claim 4 wherein the mushroom is *Lentinus edodes*.

13. A method according to claim 5 wherein the mushroom is *Lentinus edodes*.

14. A method according to claim 6 wherein the mushroom is *Lentinus edodes*.

* * * * *